US010876619B2

(12) United States Patent
Quinn et al.

(10) Patent No.: US 10,876,619 B2
(45) Date of Patent: Dec. 29, 2020

(54) TRANSFER CASE LUBRICATION SYSTEM WITH SNUBBER

(71) Applicant: BorgWarner Inc., Auburn Hills, MI (US)

(72) Inventors: Robert Martin Quinn, Washington, MI (US); Ian Daniel Worcester, Royal Oak, MI (US); Branden Levi Reeves, Oxford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 480 days.

(21) Appl. No.: 15/828,476

(22) Filed: Dec. 1, 2017

(65) Prior Publication Data

US 2018/0163848 A1    Jun. 14, 2018

Related U.S. Application Data

(60) Provisional application No. 62/432,274, filed on Dec. 9, 2016.

(51) Int. Cl.
| | |
|---|---|
| *F16H 57/04* | (2010.01) |
| *B60K 17/344* | (2006.01) |
| *F16H 7/06* | (2006.01) |
| *F16H 7/18* | (2006.01) |
| *F16H 57/05* | (2006.01) |

(52) U.S. Cl.
CPC ....... *F16H 57/0423* (2013.01); *B60K 17/344* (2013.01); *F16H 7/06* (2013.01); *F16H 7/18* (2013.01); *F16H 57/05* (2013.01); *F16H 2007/185* (2013.01)

(58) Field of Classification Search
CPC ............. F16H 57/0423; F16H 57/0424; F16H 57/0428; F16H 57/05; F16H 57/042; F16H 57/0457; F16H 57/0421; F16H 57/0473; F16H 57/0409; F16H 57/04; F16H 7/06; F16H 7/02; F16H 7/023; F16D 13/74; B60K 17/344; B60K 17/34; B60K 17/342
See application file for complete search history.

(56) References Cited

U.S. PATENT DOCUMENTS

| | | | | |
|---|---|---|---|---|
| 3,529,698 | A * | 9/1970 | Nelson | B61C 17/08 184/6.12 |
| 7,743,888 | B2 | 6/2010 | Allen et al. | |
| 9,423,017 | B1 * | 8/2016 | Francis | F16H 57/0446 |
| 9,440,532 | B1 | 9/2016 | Jongebloed et al. | |
| 9,638,314 | B2 * | 5/2017 | Cradit | F16H 57/0473 |
| 2002/0042316 | A1 * | 4/2002 | Young, Jr. | F16H 7/18 474/140 |
| 2006/0054407 | A1 * | 3/2006 | Wirth | F16H 57/05 184/6.12 |
| 2010/0101351 | A1 * | 4/2010 | Lafer | F16H 57/0421 74/467 |
| 2010/0180721 | A1 * | 7/2010 | Quehenberger | F16H 57/0419 74/606 R |

(Continued)

*Primary Examiner* — Michael R Mansen
*Assistant Examiner* — Raveen J Dias
(74) *Attorney, Agent, or Firm* — von Briesen & Roper, s.c.

(57) ABSTRACT

A lubrication system for a transfer case may include a sump. A drive chain may be in operable association with the sump. A snubber may be disposed in close proximity to the drive chain. The snubber may include a channel and a conduit in fluid communication with the channel.

15 Claims, 4 Drawing Sheets

(56) References Cited

U.S. PATENT DOCUMENTS

| | | | |
|---|---|---|---|
| 2011/0192245 A1* | 8/2011 | Shioiri | F16H 57/0423 74/467 |
| 2013/0190114 A1* | 7/2013 | Neumeister | F16H 57/0409 474/93 |
| 2015/0060228 A1 | 3/2015 | Francis et al. | |
| 2015/0240935 A1* | 8/2015 | Kampe | F16H 57/0489 474/91 |
| 2015/0337948 A1* | 11/2015 | Leitgeb | F16H 57/0423 74/665 GE |
| 2016/0208866 A1* | 7/2016 | Palazzolo | F04B 53/18 |
| 2016/0341300 A1* | 11/2016 | Drill | F16D 13/74 |
| 2017/0108111 A1* | 4/2017 | Steward | F16H 57/0457 |
| 2017/0152933 A1* | 6/2017 | Drill | F16H 57/05 |
| 2017/0299046 A1* | 10/2017 | Reth | F16D 13/72 |
| 2018/0149260 A1* | 5/2018 | Singh | F16H 57/0417 |
| 2018/0238434 A1* | 8/2018 | Zhang | F16H 57/05 |
| 2018/0238435 A1* | 8/2018 | Boerema | F16H 7/02 |
| 2018/0264939 A1* | 9/2018 | Ryman | F16D 13/52 |
| 2019/0309840 A1* | 10/2019 | Alexiou | F16H 57/027 |
| 2020/0018388 A1* | 1/2020 | Alexiou | B60K 17/28 |

\* cited by examiner

TRANSFER CASE LUBRICATION SYSTEM WITH SNUBBER

CROSS-REFERENCE TO RELATED APPLICATION

This is a U.S. National Phase Patent Application claiming priority under 35 U.S.C § 119(e) to U.S. Provisional Patent Application No. 62/432,274, filed on Dec. 9, 2016.

FIELD OF DISCLOSURE

The present disclosure relates generally to transfer cases, and more particularly to lubrication systems for such transfer cases.

BACKGROUND OF DISCLOSURE

The powertrain of some vehicles includes a transfer case, which receives driving power from a transmission of the vehicle and can distribute that power to a primary output shaft for driving a primary axle and to a secondary output shaft for driving a secondary axle. In some instances, the transfer case can selectively distribute the power from the transmission to the secondary output shaft such that the power either can be distributed solely to the primary shaft or to both the primary shaft and the secondary shaft. The transfer case, as well as other powertrain devices, typically include rotating and actuated components that require lubrication to function properly.

In efforts to supply such components with proper lubrication, some designs have implemented a pump to deliver lubricant to the components. In some designs, the pump may be mounted to one of the shafts associated with the transfer case, such as the primary output shaft, in such a manner to deliver the lubricant via axial bores formed in the shaft. Such pumps, however, may provide either a mechanical or an electrical load on the engine of the vehicle.

As an example, U.S. Pat. No. 7,743,888 ('888 patent) discloses a transfer case having an integrated lubrication system. The lubrication system of the '888 patent includes two hydraulic pumps for delivering lubricant within the transfer case. Accordingly, improvements in delivering lubricant to the rotating and actuated components of a transfer case and other powertrain devices, without the inherent losses associated with powered pumps, continue to be sought.

SUMMARY OF DISCLOSURE

In accordance with an aspect of the disclosure, a transfer case is provided. The transfer case may include a housing. A sump may be disposed in the housing. A transfer case shaft may be operably disposed through the housing. A clutch may be operably associated with the transfer case shaft. The clutch may include a clutch cam. A drive chain may be operably disposed in the housing. The drive chain may be in operable association with the sump. A mounting flange may be disposed in the housing. A snubber may be secured to the mounting flange and disposed in close proximity to the drive chain. The snubber may include a channel and conduit in fluid communication with the channel. A hose may be fluidly coupled to the clutch cam.

In accordance with another aspect of the disclosure, a lubrication system for a transfer case is provided. The lubrication system may include a sump. A drive chain may be in operable association with the sump. A snubber may be disposed in close proximity to the drive chain. The snubber may include a channel and a conduit in fluid communication with the channel.

In accordance with yet another aspect of the disclosure, a snubber for a transfer case is provided. A snubber may include a chain surface and a case surface oppositely facing the chain surface. The case surface and the chain surface may both extend between a receiving edge and a trailing edge. A conduit may be disposed through the chain surface and the case surface. The conduit may outwardly protrude from the case surface. A channel may be recessed in the chain surface and may be in fluid communication with the conduit. The channel may extend from the conduit to the receiving edge and may flaringly diverge therebetween.

These and other aspects and features of the present disclosure may be better appreciated by reference to the following detailed description and accompanying drawings.

It should be understood that the drawings are not to scale, and that the disclosed embodiments are illustrated only diagrammatically and in partial views. It should also be understood that this disclosure is not limited to the particular embodiments illustrated herein.

DETAILED DESCRIPTION

Figure 1:
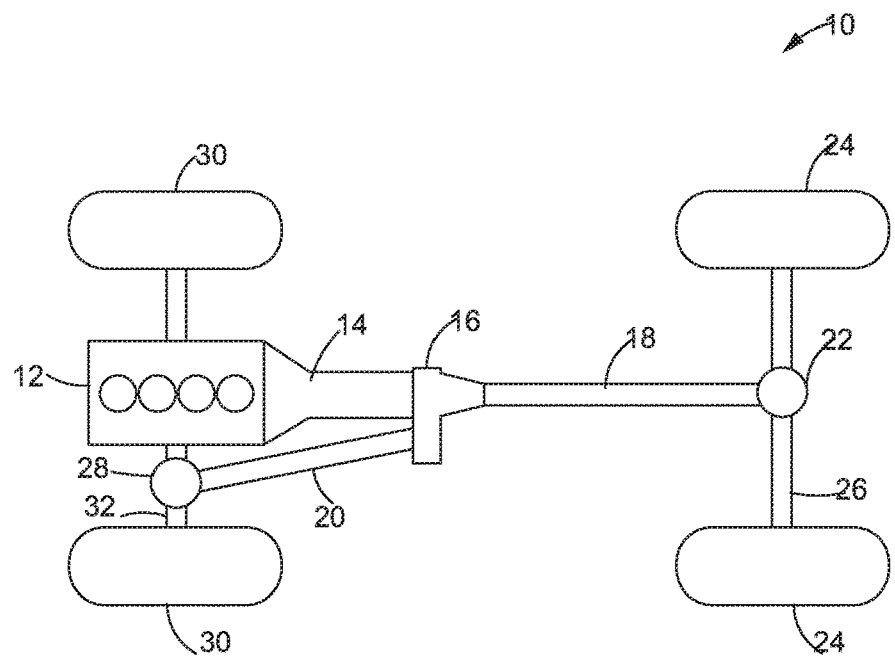
FIG. 1 is a diagrammatic view of a vehicle, in accordance with an embodiment of the present disclosure.

Referring now to FIG. 1, an exemplary vehicle constructed in accordance with the present disclosure is generally referred to by reference numeral 10. The vehicle 10 may be any type of vehicle such as, but not limited to, automobiles, trucks, vans, and other well-known vehicles. The vehicle 10 includes a power source 12. The power source 12 may be any type of power source well-known in the industry such as, but not limited to, internal or external combustion engines, gas turbine engines, diesel engines, electric motors, and any combination thereof. The vehicle 10 also includes a transmission 14 operatively coupled to the power source 12. The power source 12 provides driving power to the transmission 14 for operably converting the speed and torque of the driving power. As non-limiting examples, the transmission 14 can be a manual transmission, an automatic transmission, a semi-automatic transmission, a continuously variable transmission, a dual clutch transmission, or any other type of transmission well-known in the industry.

The vehicle 10 also includes a transfer case 16 operably coupled to the transmission 14. The transmission 14 provides driving power to the transfer case 16 such that the transfer case 16 operably distributes the driving power to a first drive shaft 18 and a second drive shaft 20 of the vehicle 10. In some embodiments, the transfer case 16 is configured to selectively switch between a first drive mode (e.g. rear-wheel drive) and a second drive mode (e.g. all-wheel drive). In the first drive mode, the transfer case 16 provides driving power to the first drive shaft 18, but does not provide driving power to the second drive shaft 20. In the second drive mode, the transfer case 16 provides driving power to both the first drive shaft 18 and the second drive shaft 20. In other embodiments, in the first drive mode, the transfer case 16 provides driving power to the second drive shaft 20, but does not provide driving power to the first drive shaft 18; and while in the second drive mode, the transfer case 16 provides driving power to both the first drive shaft 18 and the second drive shaft 20. In some other embodiments, the transfer case 16 is configured with a single drive mode such that the transfer case 16 constantly provides driving power to both the first drive shaft 18 and the second drive shaft 20.

Moreover, the first drive shaft 18 is operably coupled to a first differential 22 for providing driving power to a first set of wheels 24 via a first axle 26. The first differential 22 is operably coupled to the first axle 26, which in turn is operably coupled to the first set of wheels 24. In some embodiments, the first axle 26 is a solid axle while in other embodiments the first axle 26 is a pair of independent half axles. In a similar manner, the second drive shaft 20 is operably coupled to a second differential 28 for providing driving power to a second set of wheels 30 via a second axle 32. The second differential 28 is operably coupled to the second axle 32, which in turn is operably coupled to the second set of wheels 30. In some embodiments, the second axle 32 is a solid axle while in other embodiments the second axle is a pair of independent half axles.

Figure 2:
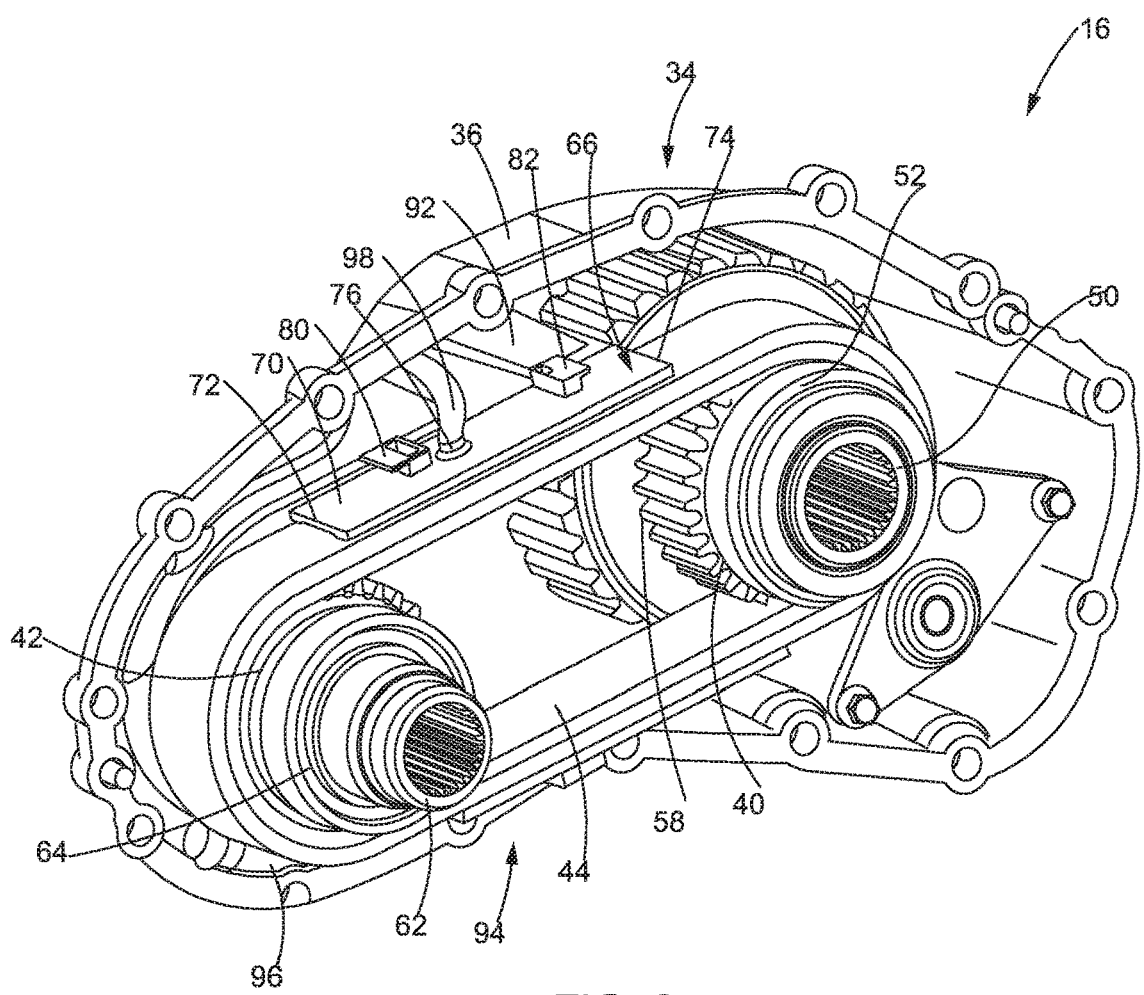
FIG. 2 is a perspective view of an exemplary transfer case, with a section of the housing removed to illustrate internal components, in accordance with an embodiment of the present disclosure.
Figure 3:
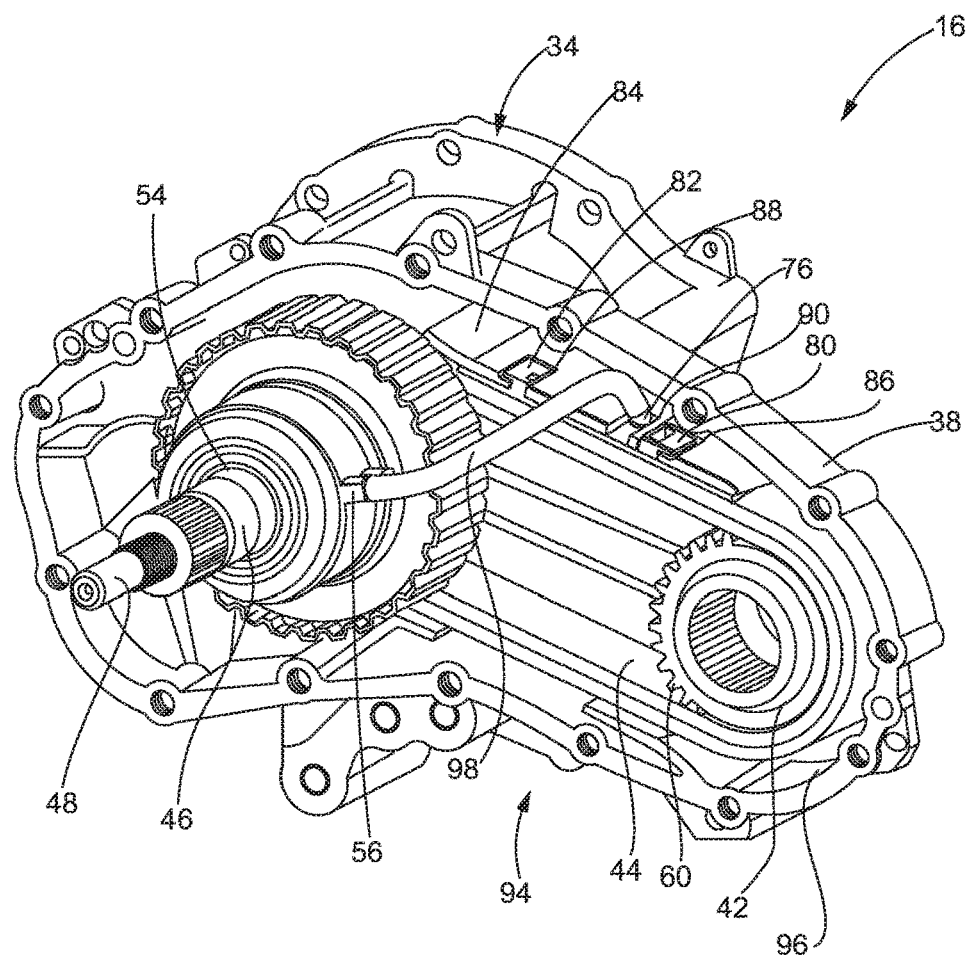
FIG. 3 is perspective view from the opposite side of the exemplary transfer case in FIG. 2, with an opposite section of the housing removed to illustrate internal components, in accordance with an embodiment of the present disclosure.

With particular reference to FIGS. 2 and 3, the transfer case 16 includes a housing 34. The housing 34 may be formed of a first half-housing 36 (shown in FIG. 2) and a second half-housing 38 (shown in FIG. 3) which may be coupled to the first half-housing 36 in any manner well-known in the industry. The transfer case 16 further includes a first sprocket 40, a second sprocket 42, a drive chain 44, and a first transfer case shaft 46. The first transfer case shaft 46 includes an input 48 and an output 50 disposed at the opposite end of the first transfer case shaft 46 from the input 48. The first transfer case shaft 46 is disposed through the housing 34 of the transfer case 16 and is rotatably supported with respect to the transfer case 16 via a first plurality of bearings 52. The input 48 of the first transfer case shaft 46 is mechanically coupled to the transmission 14 for receiving the driving power therefrom. Moreover, the output 50 is mechanically coupled to the first drive shaft 18 such that driving power received from the transmission 14 via the input 48 continually drives the first drive shaft 18.

The first sprocket 40 is selectively engageable with the first transfer case shaft 46 via a clutch 54. The clutch 54 includes a clutch cam 56 for actuating the clutch 54. The first sprocket 40 includes a first plurality of sprocket teeth 58 disposed on the exterior thereof. The first plurality of sprocket teeth 58 is mechanically engaged with the drive chain 44. The second sprocket 42 includes a second plurality of sprocket teeth 60 disposed on the exterior thereof. The second plurality of sprocket teeth 60 is mechanically engaged with the drive chain 44.

Moreover, the transfer case 16 includes a second transfer case shaft 62 disposed through the housing 34 of the transfer case 16. The second transfer case shaft 62 is rotatably supported with respect to the transfer case 16 via a second plurality of bearings 64. The second sprocket 42 is mechanically coupled to the second transfer case shaft 62, which is mechanically coupled to the second drive shaft 20. For example, in the second drive mode, the clutch 54 is selectively actuated to mechanically engage the first transfer case shaft 62 with the first sprocket 40 such that the rotation of the first sprocket 40 drives the second sprocket 42 and the second transfer case shaft 62 via the drive chain 44. Accordingly, the second sprocket 42 mechanically drives the second drive shaft 20 via the second transfer case shaft 62. Thus, driving power is distributed from the transmission 14 through the transfer case 16 and the second drive shaft 20 to drive the second set of wheels 30 via the second differential 28 and the second axle 32, as well as being distributed from the transmission 14 through the transfer case 16 to the first drive shaft 18 via the first transfer case shaft 46.

Figure 4:
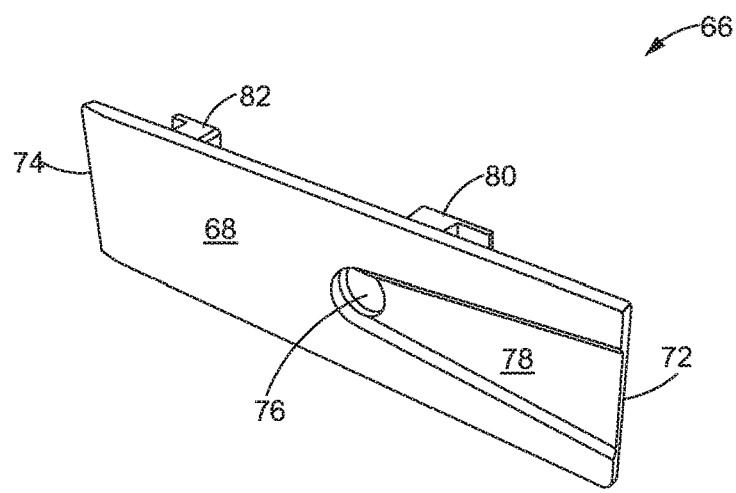
FIG. 4 is a perspective view of an exemplary snubber, in accordance with an embodiment of the present disclosure.

Referring to FIGS. 2-4, the transfer case 16 further includes a snubber 66. The snubber 66 is disposed in the transfer case 16 adjacent the drive chain 44 for limiting movement and dampening vibration of the drive chain 44. The snubber 66 includes a chain surface 68 and a case surface 70 oppositely facing the chain surface 68. The chain surface 68 and the case surface 70 are both generally elongate and extend between a receiving edge 72 and a trailing edge 74. The snubber 66 includes a conduit 76 disposed through the chain surface 68 and the case surface 70 such that conduit 76 protrudes outwardly from the case surface 70.

Moreover, the snubber 66 includes a channel 78 recessed in the chain surface 68. The channel 78 is in fluid communication with the conduit 76 and extends from the conduit 76 to the receiving edge 72. In some embodiments, the channel 78 flaringly diverges from the conduit 76 to the receiving edge 72 such that the channel 78 has a V-shape with the vertex of the V proximate the conduit 76.

The snubber 66 includes a first arm 80 and a second arm 82. The first arm 80 and the second arm 82 extend outwardly from the case surface 70 and are spaced apart from one another. In some embodiments, the conduit 76 is disposed between the first arm 80 and the second arm 82. The first arm 80 and the second arm 82 are securable to the transfer case 16.

In some embodiments, the transfer case 16 includes a mounting flange 84 disposed on the second half-housing 38 of the housing 34 for securing the snubber 66 in place with respect to the drive chain 44. In particular, the mounting flange 84 includes a first mating slot 86 and a second mating slot 88 for matingly and securely receiving the first arm 80 and the second arm 82, respectively. The mounting flange 84 also includes a conduit slot 90 for receiving the conduit 76. In some embodiments, the conduit slot 90 is disposed between the first mating slot 86 and the second mating slot 88. The transfer case 16 also includes an abutting flange 92 disposed in the first half-housing 36 of the housing 34. When the first half-housing 36 is coupled to the second half-housing 38, and with the first arm 80 and the second arm 82 matingly received by the first mating slot 86 and the second mating slot 88, respectively, the abutting flange 92 abuts the mounting flange 84 to secure the first arm 80 and the second arm 82 therebetween. As such, the snubber 66 is secured within the transfer case 16 and arranged with the chain surface 68 in close proximity to the drive chain 44.

Figure 5:
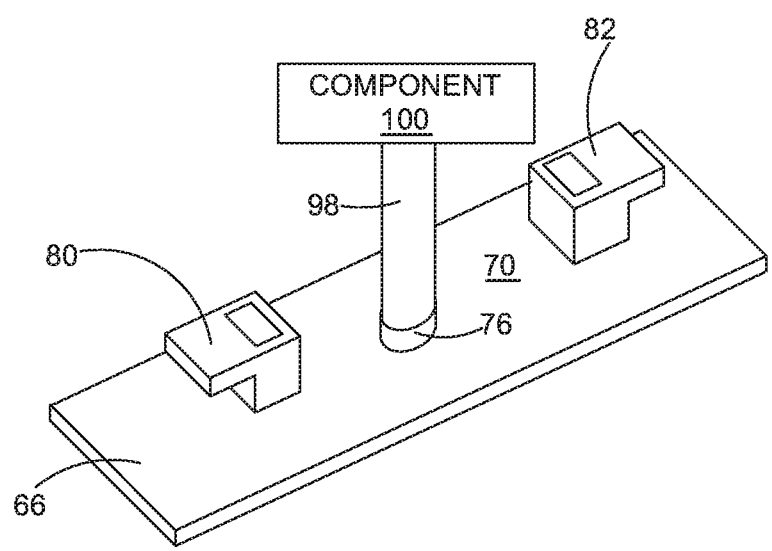
FIG. 5 is another perspective view of the exemplary snubber, with the transfer case removed, illustrating lubricant delivery to alternative transfer case components, in accordance with embodiments of the present disclosure.

As explained in more detail below, the transfer case 16 includes a lubrication system 94 for passively delivering lubricant to rotating and actuated components of the transfer case 16. The lubrication system 94 of the transfer case 16 includes a sump 96 disposed proximate the second sprocket 42. The sump 96 is arranged in the transfer case 16 such that, during operation, the drive chain 44 passes through a lubricant contained in the sump 96. The drive chain 44 collects some of the lubricant as it passes through the sump 96 and travels toward the receiving edge 72 of the snubber 66. As the drive chain 44 passes the snubber 66, the channel 78 collects and routes some of the lubricant from the drive chain 44 through the conduit 76. A hose 98 is fluidly coupled to the conduit 76 for directing the lubricant to various components of the transfer case 16 such as, but not limited to, the clutch cam 56, the first plurality of bearings 52, the second plurality of bearings 64, and other various components. With reference to FIG. 3, for example, the hose 98 is fluidly coupled to the clutch cam 56 for supplying lubrication to the clutch 54. In other embodiments, the hose 98 is fluidly coupled to a transfer case component 100, as illustrated in FIG. 5, such as the first plurality of bearings 52, the second plurality of bearings 64, or other components like seals for example.

INDUSTRIAL APPLICABILITY

Based on the foregoing, it can be seen that the present disclosure can find applicability in various types of vehicles such as, but not limited to, automobiles, trucks, vans, and other well-known vehicles. Through the novel teachings set forth above, the snubber 66 provides a passive lubrication system 94 for delivering lubricant to rotating and actuated components of the transfer case 16. Moreover, by passively delivering lubrication to the components, the lubrication system 94 of the present disclosure may overcome the challenges presented in lubrication systems of other transfer cases, which implement pumps for delivering the lubricant and inherently induce losses on the system.

For example, during operation, the drive chain 44 rotates and collects lubricant as it passes through the sump 96. After passing through the sump 96, the drive chain 44 continues rotating to convey lubricant to the snubber 66. As the drive chain 44 passes the receiving edge 72 of the snubber 66, lubricant is forced into the channel 78 due to the close proximity between the chain surface 68 of the snubber 66 and the drive chain 44. The channel 78 collects and directs some of the lubricant from the drive chain 44 to the conduit 76. Without the need of any pumps or other powered devices, the conduit 76 of the snubber 66 passively delivers the lubricant to the clutch cam 56, for example, via the hose 98.

Figure 6:
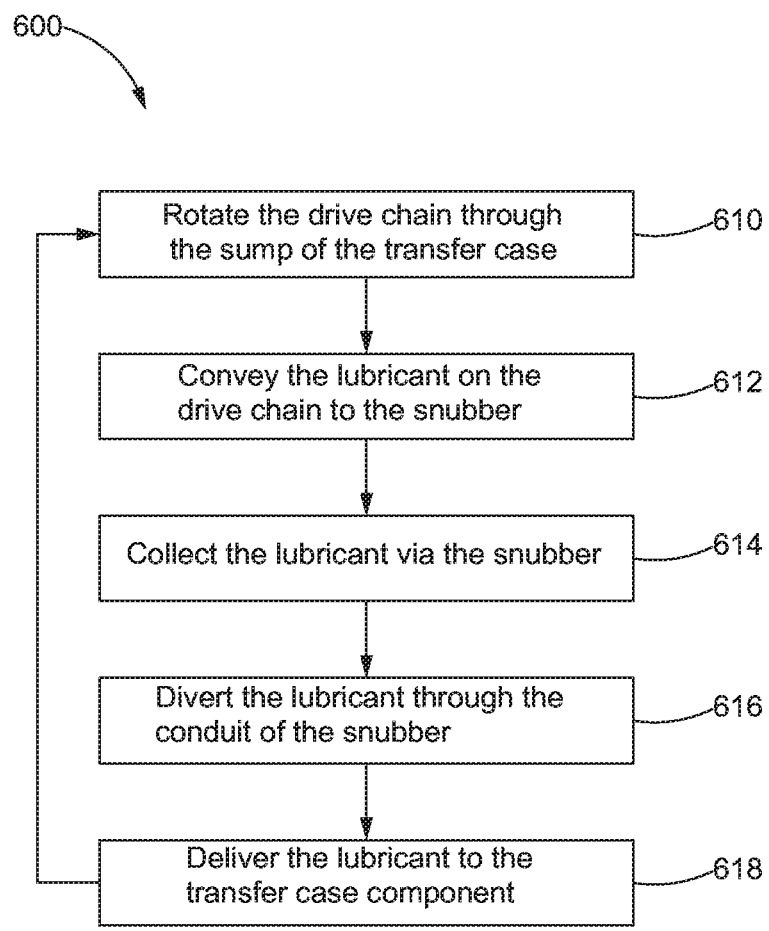
FIG. 6 is a block diagram illustrating a sample sequence of blocks which may be practiced in accordance with the teachings of the present disclosure.

FIG. 6 illustrates a block diagram 600 of a sample sequence which may be performed to passively deliver lubricant to transfer case components. As illustrated in block 610, the drive chain 44 may be rotated through the sump 96 of the transfer case 16 to collect lubricant. The drive chain 44 conveys the lubricant to the snubber 66, as illustrated in block 612. As the drive chain 44 passes the snubber 66, the channel 78 of the snubber 66 collects the lubricant, as depicted in block 614. As illustrated in block 616, the lubricant is diverted to conduit 76 from the channel 78. The lubricant is then delivered to a transfer case component 100 via the hose 98, as illustrated in block 618. The sequence may be repeated as illustrated by the return path back to block 610.

What is claimed is:

1. A transfer case (16), comprising:
   a housing (34);
   a sump (96) disposed in the housing (34);
   a transfer case shaft (46) operably disposed through the housing (34);
   a clutch (54) operably associated with the transfer case shaft (46), the clutch (54) including a clutch cam (56);
   a drive chain (44) operably disposed in the housing (34), the drive chain (44) in operable association with the sump (96);
   a mounting flange (84) disposed in the housing (34);
   a snubber (66) secured to the mounting flange (84), the snubber (66) disposed in close proximity to the drive chain (44), the snubber (66) including a channel (78) a conduit (76) in fluid communication with the channel (78), and a plurality of arms extending from a case surface (80); and
   a hose (98) fluidly coupled to the conduit (76) and the clutch cam (56).

2. The transfer case (16) of claim 1, wherein the plurality of arms further includes a first arm (80) and a second arm (82), and the mounting flange (84) further includes a first mating slot (86) and a second mating slot (88), the first mating slot (86) and the second mating slot (88) matingly receive the first arm (80) and the second arm (82), respectively.

3. The transfer case (16) of claim 2, further including an abutting flange (92) disposed in the housing (34), the abutting flange (92) abuts the mounting flange (84) wherein the first arm (80) and the second arm (82) are secured between the abutting flange (92) and the mounting flange (84).

4. The transfer case (16) of claim 2, wherein the channel (78) is recessed in a chain surface (68) of the snubber (66) and is disposed between the conduit (76) and a receiving edge (72) of the snubber (66).

5. The transfer case (16) of claim 4, wherein the channel (78) flaringly diverges from the conduit (76) toward the receiving edge (72) of the snubber (66).

6. The transfer case (16) of claim 5, wherein the conduit (76) is disposed between the first arm (80) and the second arm (82).

7. A lubrication system (94) for a transfer case (16), the lubrication system (94) comprising:
   a sump (96);
   a drive chain (44) in operable association with the sump (96); and
   a snubber (66) disposed in close proximity to the drive chain (44), the snubber (66) including a plurality of arms extending from a case surface (70), a channel (78) and a conduit (76) in fluid communication with the channel (78).

8. The lubrication system (94) of claim 7, further including a hose (98) fluidly coupled to the conduit (76).

9. The lubrication system (94) of claim 8, wherein the hose (98) is in fluid communication with a transfer case component (100).

10. The lubrication system (94) of claim 7, wherein channel (78) is recessed in a chain surface (68) of the snubber (66) and disposed between the conduit (76) and a receiving edge (72) of the snubber (66).

11. The lubrication system (94) of claim 10, wherein the channel (78) flaringly diverges from the conduit (76) toward the receiving edge (72) of the snubber (66).

12. A snubber (66) for a transfer case (16), comprising:
   a chain surface (68);
   a case surface (70) oppositely facing the chain surface (68), the case surface (70) and the chain surface (68) both extending between a receiving edge (72) and a trailing edge (74);
   a plurality of arms extending from the case surface (70);

a conduit (76) disposed through the chain surface (68) and the case surface (70), the conduit (76) outwardly protruding from the case surface (70); and a channel (78) recessed in the chain surface (68), the channel (78) in fluid communication with the conduit (76), the channel (78) extending from the conduit (76) to the receiving edge (72) and flaringly diverges therebetween.

13. The snubber (66) of claim 12, the plurality of arms including a first arm (80) and a second arm (82).

14. The snubber (66) of claim 13, wherein the conduit (76) is disposed between the first arm (80) and the second arm (82).

15. The snubber (66) of claim 14, further including a hose (98) fluidly coupled to the conduit (76), the hose (8) fluidly couplable to a transfer case component (100) of the transfer case (16).

* * * * *